United States Patent
Mori

[11] Patent Number: 5,954,172
[45] Date of Patent: Sep. 21, 1999

[54] FRICTION FACING IN SLIP-CONTROLLED LOCKUP CLUTCH CONFIGURATION

[75] Inventor: Masaki Mori, Neyagawa, Japan

[73] Assignee: Exedy Coporation, Neyagawa, Japan

[21] Appl. No.: 08/980,791

[22] Filed: Dec. 1, 1997

[51] Int. Cl.⁶ .............................. F16H 45/02; F16D 13/72
[52] U.S. Cl. ................ 192/3.29; 192/107 R; 192/113.36
[58] Field of Search ........................... 192/107 R, 113.36, 192/3.29

[56] References Cited

U.S. PATENT DOCUMENTS

| | | | |
|---|---|---|---|
| 3,422,936 | 1/1969 | Marcheron | 192/107 R |
| 3,446,323 | 5/1969 | Hilpert | 192/107 R |
| 3,904,000 | 9/1975 | Berger | 192/107 R |
| 4,396,100 | 8/1983 | Eltze | 192/107 R |
| 4,512,450 | 4/1985 | Babcock | 192/107 R |
| 4,674,616 | 6/1987 | Mannino | 192/107 R |
| 4,697,684 | 10/1987 | Maycock et al. | 192/107 R |
| 4,785,924 | 11/1988 | Jackel | 192/3.29 |
| 5,332,075 | 7/1994 | Quigley et al. | 192/107 R |

*Primary Examiner*—Rodney H. Bonck
*Attorney, Agent, or Firm*—Shinjyu

[57] ABSTRACT

Oil is introduced into gaps between divided pieces forming a friction facing to enhance sealability of working oil of a lockup clutch upon operation of the lockup clutch to enhance sliding characteristics and durability of the friction facing. The friction facing 30 is included in the lockup clutch 2 of a torque convertor 1, and includes a plurality of divided pieces divided in the circumferential direction. Gaps that are out of fluid communication from the outer circumferential side to the inner circumferential side are provided between the divided pieces with the lockup clutch in an engaged state.

4 Claims, 2 Drawing Sheets ns
FRICTION FACING IN SLIP-CONTROLLED LOCKUP CLUTCH CONFIGURATION

BACKGROUND OF THE INVENTION

A. Field of the Invention

The present invention relates to a friction facing and a lockup clutch using the friction facing, and more particularly to those to be used in a torque convertor for performing a lockup slippage control.

B. Background of the Invention

In general, a torque convertor is composed of a front cover and three kinds of vane wheels (impeller, turbine and stator). When the impeller is rotated together with a front cover, working oil is circulated through vanes of the impeller and subsequently moves against vanes of the turbine and the stator. Rotation of the impeller is thereby transmitted to the turbine. Some torque convertors are provided with a lockup clutch that may mechanically couple the front cover and the turbine with each other thereby bypassing power transmission via rotation of the impeller.

The working oil for controlling the engagement and disengagement of the lockup clutch is introduced through a gap between the inner circumferential portion of the turbine and the front cover during the disengagement. The working oil is caused to pass between the front cover and the lockup clutch and to flow from a space between the outer circumferential portion of the impeller and the outer circumferential portion of the turbine to a space between the impeller and the turbine. The working oil is merged into the working oil for hydraulically connecting the impeller and the turbine with each other and is discharged from a gap between the inner circumferential portion of the turbine and the stator or a gap between the inner circumferential portion of the impeller and the stator. When the lockup clutch is in engagement, the working oil residing between the front cover and the lockup clutch is drained through the gap between the inner circumferential portion of the turbine and the front cover so that the lockup clutch is brought into pressing contact with the front cover by the oil-pressure balance.

Some lockup clutches include a vibration dampening spring to reduce the impact forces experienced upon engagement of the lockup clutch. In torque convertors having such a lockup clutch, lockup slippage control has also been added. The lockup slippage control is an additional control that, in circumstances where suppression of vibrations by means of the damper characteristics of the lockup clutch are insufficient, the vibrations are absorbed by slidingly moving the friction facings of the lockup clutch that are in contact with the front cover. In this control, the above-described oil-pressure balance is adjusted on the basis of an engine RPM, an output RPM and gear speed to thereby control the slippage condition. If this control is effected, even in a region in which a relatively low speed is attained and in which the conventional lockup clutch could not be operated due to the problems such as vibrations, it is possible to operate the lockup clutch. Then, if the operational range of the lockup clutch is thus broadened, the torque transmission efficiency is enhanced and a fuel consumption rate is improved in a vehicle that is provided with this torque convertor.

In the case where the lockup slippage control is effected in the above-described manner, there might be problems of sliding characteristics or durability of the friction facings. Namely, if the sliding characteristics (smoothness of slippage) of the friction facings are worse upon slippage, wavy vibrations are generated in the torque transmission to cause a vehicle shudder. Thus, the sliding characteristics become serious. The friction facings are heated due to the slippage, as a result of which the service life of the friction facings is shortened and the durability thereof may be adversely effected. To cope with these problems, conventionally, working oil is introduced by providing the friction facings with oil grooves or the like, so that the change in frictional coefficient of the frictional surfaces of the friction facings is reduced to thereby enhance the sliding characteristics. At the same time, the friction facings are cooled down by the oil to thereby enhance its durability.

On the other hand, since the friction facings are ring-like members. Accordingly, if these members are manufactured by cutting the raw or base materials, the productive yield becomes worse in that the materials are not efficiently use. There is typically substantial amounts of waste material. For this reason, there is a conventional approach that the friction facings are divided in the circumferential direction to enhance the yield.

In the case where the friction facings are composed of a plurality of divided segments in this manner, conventionally, the divided segments are not intimately arranged but gaps are provided between the segments in order to enhance the sliding characteristics and the durability. Thus, since the oil is introduced into the gaps to equally function as the above-described oil grooves formed in the friction facings to enhance the sliding characteristics and the durability of the friction facings.

However, only with the simple arrangement in which the divided segments are arranged with gaps, these gaps are in communication from the outer circumferential side to the inner circumferential side of the friction facings. Then, the working oil residing on the turbine side of the lockup clutch is caused to pass through the gaps to flow toward the front cover. As a result, the pressure of the oil, on the turbine side, of the lockup clutch to be controlled by the lockup slippage control is decreased, so that it is difficult to perform the fine lockup slippage control.

SUMMARY OF THE INVENTION

One object of the present invention is to suppress reduction of working oil pressure on a turbine side of a lockup clutch while enhancing sealability of working oil on the turbine side of the lockup clutch upon operation of the lockup clutch in the case where working oil is introduced into gaps between divided pieces which form a friction facing of the lockup clutch to enhance sliding characteristics and durability of the friction facing.

In accordance with one aspect of the present invention, a friction facing for a lockup clutch of a torque convertor includes a plurality of arcuate members fitted together to form an annular friction facing. Each of the arcuate members is formed with at least two radially extending end surfaces that are circumferentially offset from one another. The end surfaces of a first of the arcuate members is adjacent to the end surfaces of a second of the arcuate members. The end surfaces of the first of the arcuate members define gaps with the end surfaces of the second of the arcuate members.

Preferably, a circumferentially extending surface is defined between each of the end surfaces. The circumferentially extending surface of the first of the arcuate members contacts the circumferentially extending surface of the second of the arcuate members.

In accordance with another aspect of the present invention, a lockup clutch for a torque convertor includes a clutch member connected to a turbine within the torque convertor. The clutch member is configured for selective contact with a front cover of the torque convertor. A friction facing is formed on the clutch member. The friction facing includes a plurality of arcuate members fitted together to form an annular friction facing. Each of the arcuate members is formed with at least two radially extending end surfaces that are circumferentially offset from one another, The end surfaces of a first of the arcuate members are adjacent to the end surfaces of a second of the arcuate members. The end surfaces of the first of the arcuate members define gaps with the end surfaces of the second of the arcuate members.

Preferably, a circumferentially extending surface is defined between each of the end surfaces. The circumferentially extending surface of the first of the arcuate members contacts the circumferentially extending surface of the second of the arcuate members.

In general, the oil chamber within the torque convertor is divided into a high-pressure oil chamber and a low-pressure oil chamber by the lockup clutch. Then, when the lockup clutch is engaged, the lockup clutch is in pressing contact with or slidably moved relative to the front cover of the torque convertor through the friction facing by the oil-pressure balance between the two chambers. Thus, the rotation of the front cover of the torque convertor is transmitted to the turbine through the lockup clutch and not through the working oil.

In this case, when the oil pressure balance of on each side of the clutch member is controlled (lockup slippage control), limited slippage is allowed between the friction facing mounted on the lockup clutch and the member on the input side of the torque convertor so that it is possible to suppress the generation of vibrations that could not be suppressed by the characteristics of the damper included in the lockup clutch.

In the case where the lockup slippage control is effected in this manner, heat is generated in the friction facing by the slippage. However, according to the first aspect of the invention, since gaps are formed between the divided pieces in the friction facing, the working oil of the torque convertor is introduced into the gaps, thereby cooling down the friction facing. Accordingly, it is possible to suppress the high temperature state that causes the reduction of the service life of the friction facing. Also, since the oil serves as lubricant, it is possible to suppress the change in frictional coefficient of the fictional surfaces of the friction facing upon the slippage. Thus, the change of the torque transmitted through the friction facing is reduced to thereby reduce the vehicle shudder to enhance the comfortableness of the vehicle.

Also, since the friction facing is composed of the divided pieces, the production yield is improved since there is less waste material produced in production.

According to the first aspect of the invention above, in addition to the excellent sliding characteristics and durability of the above-described friction facing, the sealability of the high-pressure oil chamber upon the lockup clutch is operated. Namely, since the gaps between the divided pieces are out of communication from the outer circumferential side to the inner circumferential side, it is possible to suppress the flow (leakage) of the working oil form the high-pressure oil chamber to the low-pressure oil chamber to stabilize the oil pressure of the high-pressure oil chamber, that is, between the two chambers. Thus, when the friction facing is in pressing contact or in sliding movement, the change of the pressure for pressing the friction facing against the front cover of the torque convertor is suppressed to stabilize the torque transmission. Also, it is easy to perform the oil pressure control of the high-pressure oil chamber in the lockup slippage control to thereby make it possible to finely perform the lockup slippage control.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

The present invention will now be described with reference to the accompanying drawings.

Figure 1:
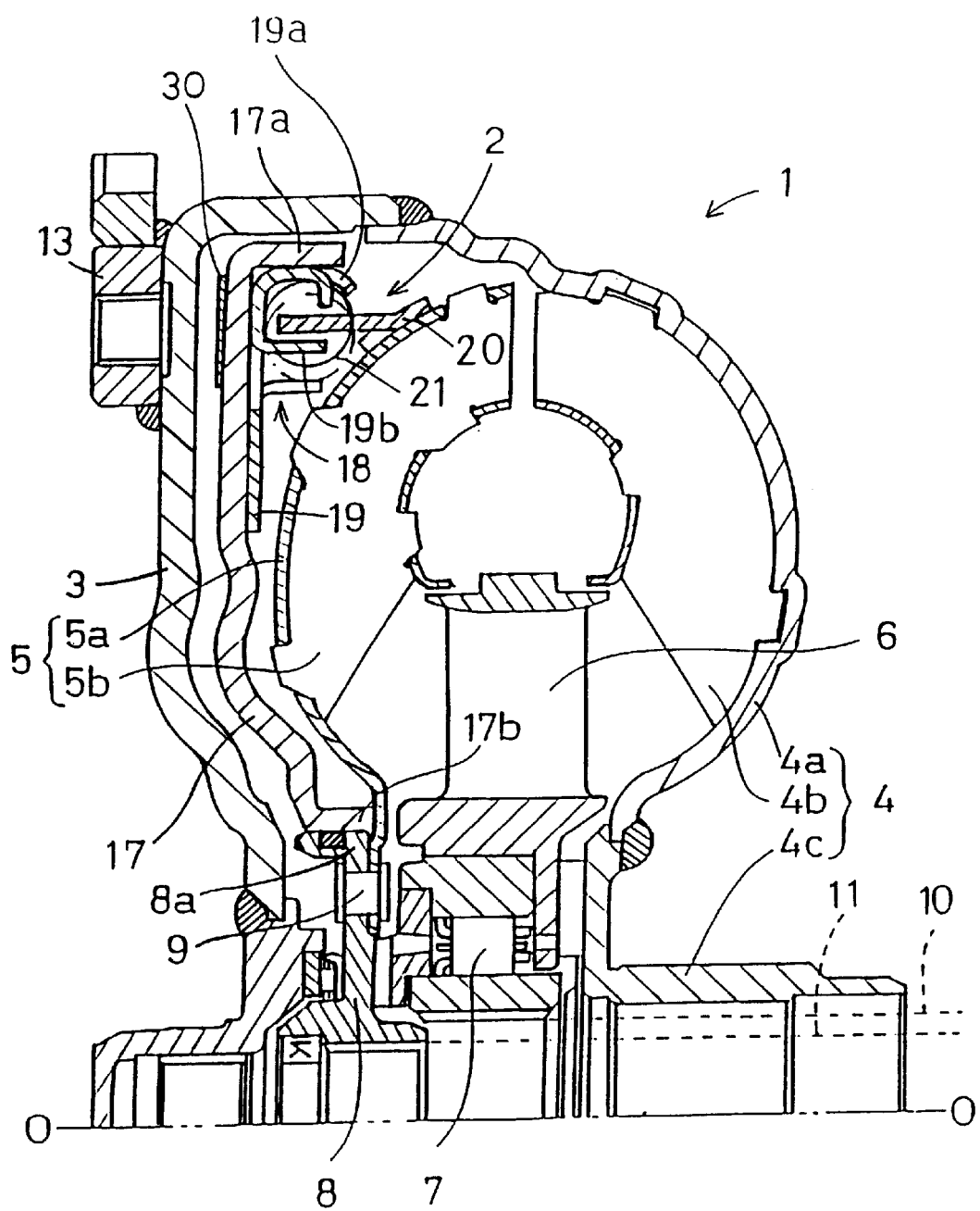
FIG. 1 is a longitudinal side cross sectional view schematically showing a torque convertor having a lockup clutch in accordance with one embodiment of the present invention.

FIG. 1 shows a torque convertor 1 according to one embodiment of the invention. In FIG. 1, line 0—0 denotes a rotary axis of the torque convertor 1, an engine (not shown) is disposed on the left side of FIG. 1 and a transmission (not shown) is disposed on the right side of FIG. 1. The left side of FIG. 1 will hereinafter be referred to as the engine side and the right side of FIG. 1 will be referred to as the transmission side.

The torque convertor 1 is a mechanism for transmitting a torque from a crankshaft on the engine side to a main drive shaft 11 on the transmission side. The torque convertor 1 is composed of a front cover 3 connected to the crankshaft on the engine side, a torque convertor body composed of three kinds of vane wheels, and impeller 4, a turbine 5 and stator 6. The torque convertor 1 also includes a lockup clutch 2. The front cover 3 and an impeller shell 4a of the impeller 4 are welded together at outer circumferential portions thereof so that the front cover and the impeller form a working oil chamber.

A plurality of nuts 13 are fastened on the engine side surface of the outer circumferential portion of the front cover 3. A flexible plate (not shown) connected to the crankshaft on the engine side is mounted on the front cover 3 through the nuts 13. Thus, the front cover 3 is connected to the crankshaft on the engine side.

The impeller 4 is composed of the impeller shell 4a, a plurality of impeller blades 4b fixed on the inside of the impeller shell 4a and an impeller hub 4c fixed to an inner circumferential end of the impeller shell 4a.

The turbine 5 is disposed to face the impeller 4 within the working oil chamber, and is mainly composed of a turbine shell 5a and a plurality of turbine blades 5b fixed to the turbine shell 5a. An inner circumferential end of the turbine shell 5a is fixed to a flange 8a of the turbine hub 8 by a plurality of rivets 9. A spline hole is formed on the inner circumference of the turbine hub 8 for being connected to the main drive shaft 11 extending from the transmission side.

The stator 6 is disposed radially inwardly between the impeller 4 and the turbine 5 and is fixed to a stator shaft 10 fixed to a housing of the transmission through a one-way clutch 7.

The lockup clutch 2 is interposed between the front cover 3 and the turbine 5 in the axial direction. The lockup clutch 2 has a damper function and is mainly composed of a disc-like piston 17, an elastic coupling mechanism 18 and friction facings 30.

In the disc-like piston 17, sleeve-like cylindrical portions 17a and 17b are formed extending on the transmission side from an end of the outer circumferential side and an end of the inner circumferential side, respectively. The inside cylindrical portion 17b is slidably supported in the axial direction and the circumferential direction to the outer circumferential wall of the turbine hub 8.

The elastic coupling mechanism 18 is disposed on the inner circumferential side of the cylindrical portion 17a on the outer circumferential side of the piston 17, and is composed of a disc-like retaining plate 19, a driven plate 20, and a plurality of torsion spring 21. The retaining plate 19 is fixed at its inner circumferential end to the piston 17 by rivets. Also, the retaining plate 19 has a cylindrical portion 19a extending in annular manner at its outer circumferential portion for receiving the torsion spring 21 in the cylindrical portion 19a. The driven plate 20 is a ring-like member and is fixed on the engine side of the turbine shell 5a. A plurality of bent claws are formed on the driven plate 20 for retaining both end portions in the circumferential direction of each torsion spring 21. Both end portions in the circumferential direction of each torsion spring 21 are retained at the bent claws of the driven plate 20 and supported to bent claws 19b formed in the retaining plate 19. Thus, the piston 17 and the turbine shell 5a are elastically connected in the circumferential direction through the elastic coupling mechanism 18.

Figure 2:
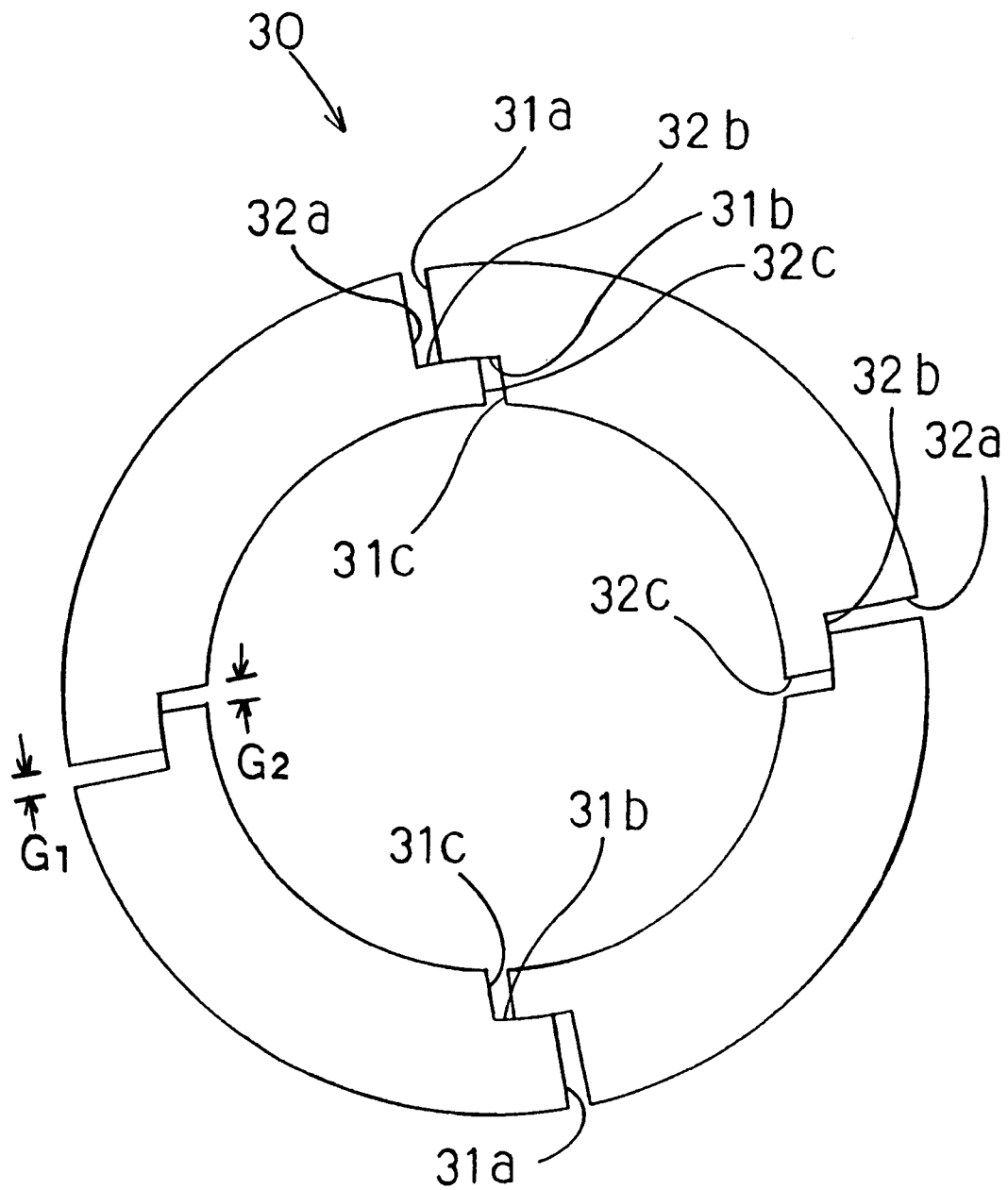
FIG. 2 is a plan view showing a friction facing of the lockup clutch shown removed from the torque convertor depicted in FIG. 1.

The friction facing 30 is an annular member and attached to a side face, on the engine side, of the piston 17. The friction facing 30 is composed of four divided pieces as shown in FIG. 2. For this reason, in comparison with an annular ring-like one-piece facing, the number of the friction facings that may be formed from raw sheet material is increased. Namely, when the friction facings 30 are cut out of the material, the productive yield is improved with less waste material.

A first outer circumferential end face 31a, a first joint face 31b and a first inner circumferential end face 31c and a second outer circumferential end face 32a, a second joint face 32b and a second inner circumferential end face 32c are formed at one end and other end of each divided piece, respectively. The first and second joint faces 31b and 32b are surfaces for connecting the surfaces between the inner circumferential ends of the first and second outer circumferential end faces 31a and 32a and the outer circumferential ends of the first and second inner circumferential end faces 31c and 32c and extend in the circumferential direction. The four divided pieces are arranged as shown in FIG. 2 and mounted on the piston 17. In this case, the first outer circumferential end face 31a and the second outer circumferential end face 32a of the other divided piece are caused to face each other so that a predetermined gap (hereinafter referred to as an outer circumferential gap $G_1$) is formed, whereas the first inner circumferential end face 31c and the second inner circumferential end face 32c of the other divided piece are caused to face each other so that a predetermined gap (hereinafter referred to as an inner circumferential gap $G_2$) is formed. Then, under this condition, a part of the first joint face 31b is in contact with a part of the second joint face 32b of the other divided piece to thereby prevent fluid communication between the outer circumferential gap $G_1$ and the inner circumferential gap $G_2$.

The working oil will now be described.

The working oil fills the working oil chamber defined between the front cover 3 and the impeller shell 4a for hydraulically coupling the impeller 4 and the turbine 5 with each other and for operating the lockup clutch 2. The working oil circulates within the torque convertor 1 and is discharged toward the radially outward portions of the torque convertor 1. Such a circulation of the working oil also serves to move the heat generated in the torque convertor 1 toward the outward portions of the torque convertor 1.

The working oil is introduced into a space defined between the turbine shell 5a and the front cover 3 for operating the lockup clutch 2 in a manner known in the art. The working oil is introduced from the gap between the turbine hub 8 and the front cover 3 through the interior of the main drive shaft 11 and is caused to flow to the vicinity of the elastic coupling mechanism 18 through the space between the piston 17 and the front cover 3. The working oil is caused to flow into a space defined between the impeller 4 and the turbine 5 from the gap between the outer circumferential portion of the impeller 4 and the outer circumferential portion of the turbine 5, and is drained through the space defined between the stator shaft 10 and the main drive shaft 11 from the space between the inner circumferential portion of the stator 6 and the inner circumferential portion of the turbine shell 5a.

The operation will now be described.

The torque of the crankshaft on the engine side is inputted from the flexible plate (not shown) into the front cover 3. This torque is transmitted to the impeller shell 4a. Thus, the impeller 4 is rotated so that working oil flows from the impeller 4 to the turbine 5. The flow of the working oil causes the turbine 5 to rotate, and the torque of the turbine 5 is outputted through the turbine hub 8 to the main drive shaft 11.

The operation of the lockup clutch 2 will now be described. In this case, the lockup clutch 2 is operated while the lockup slippage control is being effected. First of all, the operation of the lockup clutch 2 will now be explained for the circumstances where lockup slippage control is not in effect.

When the speed ratio (ratio of the output RPM to the input RPM of the torque converter) is increased and the main drive shaft 11 is rated at a constant RPM, the lockup clutch 2 is operated. Namely, the working oil residing in between the piston 17 and the front cover 3 is drained through the interior of the main drive shaft 11. As a result, by the oil-pressure balance between the front cover 3 side (low-pressure oil chamber) and the turbine 5 side (high-pressure oil chamber) of the piston 17, the piston 17 receives the pressure on the front cover 3 side so that the friction facing 30 is brought into pressing contact with the front cover 3. Thus, the torque of the front cover 3 is transmitted to the turbine 5 through the elastic coupling mechanism 18 from the piston 17. Namely, the front cover 3 is coupled with the turbine 5 in a mechanical manner so that the torque of the front cover 3 is outputted to the main drive shaft 11 through the turbine 5. However, in the case where the lockup slippage control is not effected, it is necessary to suppress the vibrations generated during the engagement down to an allowable value only by the damper characteristics of the elastic coupling mechanism 18 of the lockup clutch 2. Naturally, the speed ratio range of the torque convertor 1 in which the lockup clutch 2 is operated is limited.

The operation of the lockup clutch 2 including the lockup slippage control will now be described.

When the speed ratio of the torque convertor 1 is increased, the lockup clutch 2 is operated while the lockup slippage control is being effected. In comparison with the case where no lockup slippage control is effected, it is possible to set a speed ratio at a low level. In this case, monitoring the engine RPM, the output RPM and the gear ratio, the feedback control is effected in view of such information so that the oil pressure within the torque convertor 1 (high-pressure oil chamber) except for the space (low-pressure oil chamber) of the piston 17 on the front cover 3 side. Thus, the pressure of the working oil applied from the turbine 5 side to the piston 17 is controlled. In this control, when the RPM is lower than the control target RPM, the oil pressure in the high-pressure oil chamber is increased, whereas when the RPM is higher than the control target RPM, the oil pressure in the high-pressure oil chamber is decreased to thereby control the difference in RPM on the input side and on the output side to a desired value. Under such a control, the friction facing 30 serves to transmit torque while experiencing limited sliding relative to the front cover 3. Thus, in the lockup slippage control, the vibrations are absorbed by the action of the damper function of the slippage of the friction facing 30 in addition to the damper function of the elastic coupling mechanism 18 of the lockup clutch 2.

In such a lockup slippage control, by causing the friction facing 30 to slip, the large vibrations generated when the lockup clutch 2 is operated at the low speed ratio are absorbed. However, the friction heat is generated in the friction facing 30 by the slippage. It is therefore necessary to cool down this portion in order to maintain a satisfactory service life of the friction facing 30. Also, if the frictional coefficient of the friction facing 30 is changed upon the slippage, the wavy vibrations are generated in the torque transmission so that the torque transmission is intermittent, resulting in the vehicle shudder to make worse the comfortableness of a vehicle. Furthermore, the lockup slippage control would control the hydraulic pressure on the high-pressure oil chamber. If the working oil is caused to flow from the high-pressure oil chamber to the low-pressure oil chamber upon the slippage between the friction facing 30 and the front cover 3, it is difficult to control the oil pressure due to the variation in hydraulic pressure within the high-pressure oil chamber.

In the torque convertor 1 according to the embodiment, since the working oil is introduced in the outer circumferential gaps or the inner circumferential gaps provided between the divided pieces of the friction facing 30, the friction facing 30 is cooled down by the working oil. In particular, since the oil is introduced from the high-pressure oil chamber to the outer circumferential gaps to cool down the friction facing 30 during the slippage between the friction facing 30 and the front cover 3, it is possible to moderate the high temperature state that would cause the reduction of the service life of the friction facing 30. Also, since the oil maintained in the outer circumferential gaps serves as a lubricant for the frictional surface (sliding surface) of the friction facing 30 by the sliding movement between the friction facing 30 and the front cover 3, it is possible to maintain satisfactory and stable frictional characteristics against the long term slippage state (sliding condition). Furthermore, since the outer circumferential gaps of the friction facing 30 are out of the communication with the inner circumferential gaps thereof, in principle, the working oil is prevented from flowing from the high pressure oil chamber to the low-pressure oil chamber. It is therefore stable and easy to control the oil pressure under the lockup slippage control while keeping sealability of the high-pressure oil chamber.

Incidentally, as described above, since the oil is not held (has been drained) in the inner circumferential gaps of the friction facing 30 upon the sliding movement between the friction facing 30 and the front cover 3, it is preferable to reduce the inner circumferential gaps while enlarging the outer circumferential gaps within an allowable range of the structure.

According to the present invention, since the structure is adopted in which the outer circumferential ones of the gaps between the divided pieces forming the friction facing are out of communication with the inner circumferential ones thereof, the sealability of the high-pressure oil chamber upon the lockup clutch operation is enhanced in addition to the good yield by dividing the friction facing and excellent sliding characteristics and durability of the friction facing by the introduction of the oil to the gaps. It is therefore easy to effect the lockup slippage control.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A friction facing for a lockup clutch of a torque converter operating under slip control at predetermined torque converter input to output RPM ratios, wherein the friction facing is mounted on a lock-up piston separating a high-pressure fluid chamber from a low-pressure fluid chamber of the torque converter and slipping engagement of the lockup clutch is effected through feedback control of the flow of working fluid in the low-pressure and high-pressure fluid chambers, the friction facing comprising:

a plurality of inter-fitting annular segments having radially extending ends for forming joints between adjacent annular segments in mounting the friction facing on the torque converter lock-up piston; wherein the joints define radially outward high-pressure fluid chamber side gaps $G_1$ and radially inward low-pressure fluid chamber gaps $G_2$ circumferentially offset from said gaps $G_1$, and the joints are in contact such that said gaps $G_1$ are substantially fluid-sealed from said gaps $G_2$ during slipping engagement of the lockup clutch; and wherein said gaps $G_1$ and $G_2$ are dimensioned to receive working fluid in the high-pressure and low-pressure fluid chambers to dissipate heat for prolonging friction facing wear and to smooth change in frictional coefficient of the friction facing during slipping engagement of the lockup clutch.

2. A friction facing for a lockup clutch as set forth in claim 1, wherein said gap $G_1$ is larger than said gap $G_2$.

3. A lockup clutch of a torque converter operating under slip control at predetermined torque converter input to output RPM ratios, comprising:

a lock-up piston separating a high-pressure fluid chamber from a low-pressure fluid chamber of the torque converter;

means for feedback control of the flow of working fluid in the low-pressure and high-pressure fluid chambers, whereby slipping engagement of the lockup clutch is effected; and a friction facing consisting essentially of a plurality of inter-fitting annular segments having radially extending ends for forming joints between adjacent annular segments in mounting the friction facing on the torque converter lock-up piston; wherein the joints define radially outward high-pressure fluid chamber side gaps $G_1$ and radially inward low-pressure fluid chamber gaps $G_2$ circumferentially offset from said gaps $G_1$, and the joints are in contact such that said gaps $G_1$ are substantially fluid-sealed from said gaps $G_2$ during slipping engagement of the lockup clutch; and wherein said gaps $G_1$ and $G_2$ are dimensioned to receive working fluid in the high-pressure and low-pressure fluid chambers to dissipate heat for prolonging friction facing wear and to smooth change in frictional coefficient of the friction facing during slipping engagement of the lockup clutch.

4. A lockup clutch as set forth in claim 3, wherein said gap $G_1$ is larger than said gap $G_2$.

* * * * *